C. W. MILES.
GAS COMPRESSOR VALVE MECHANISM.
APPLICATION FILED AUG. 8, 1913.
1,092,782.
Patented Apr. 7, 1914.
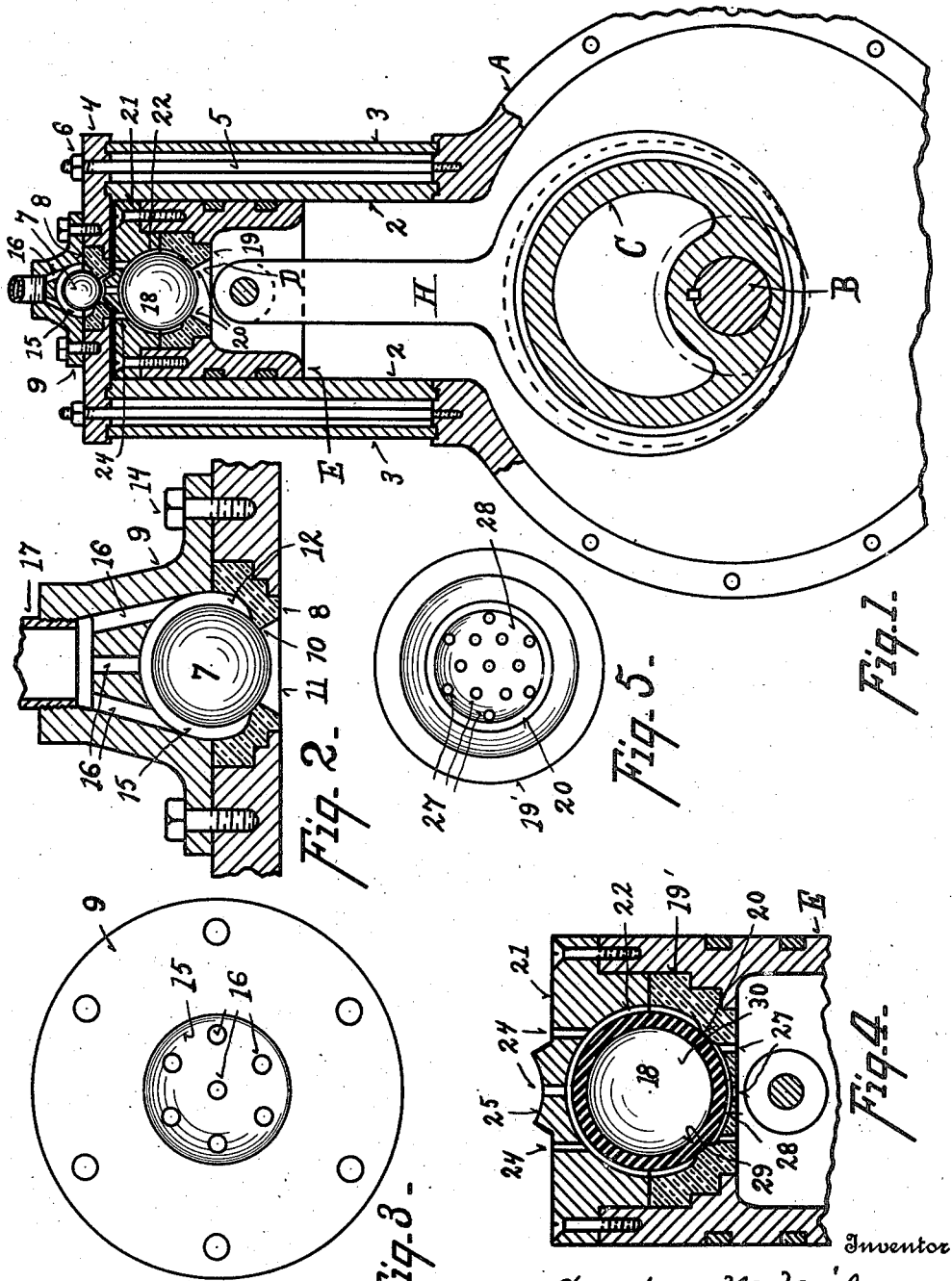

UNITED STATES PATENT OFFICE.

CASPER W. MILES, OF ANDERSON TOWNSHIP, HAMILTON COUNTY, OHIO, ASSIGNOR TO STEPHEN S. MILES, OF GREENSBORO, NORTH CAROLINA.

GAS-COMPRESSOR VALVE MECHANISM.

1,092,782.  Specification of Letters Patent.  Patented Apr. 7, 1914.

Application filed August 8, 1913. Serial No. 783,764.

*To all whom it may concern:*

Be it known that I, CASPER W. MILES, a citizen of the United States, residing in Anderson township, in the county of Hamilton and State of Ohio, have invented certain new and useful Improvements in Gas-Compressor Valve Mechanism, of which the following is a specification.

My invention relates to improvements in gas compressor valve mechanism.

One of its objects is to provide and adapt ball valves to use for compressing gases.

Another object is to provide improved valve cages and seats to support and retain the valves in place.

Another object is to employ such valves and avoid excessive clearance spaces and losses from reëxpansion.

Another object is to avoid breakage of valves and injury from the escape into the cylinder of parts of broken valves.

My invention also comprises certain details of form, combination and arrangement, all of which will be fully set forth in the description of the accompanying drawings, in which:

Figure 1 is a central vertical section through a gas compressor embodying my invention. Fig. 2 is an enlarged sectional detail of the exit valve and its cage and seat. Fig. 3 is an inside plan view of part of the exit valve cage. Fig. 4 is an enlarged sectional detail of the inlet valve and its cage and seat, illustrating a modification. Fig. 5 is a plan view of the seat portion of the cage of Fig. 4 detached.

The accompanying drawings represent the preferred embodiments of my invention in which A represents the base of a compressor, B represents the driving shaft journaled in bearings in heads detachably secured to the base, and C represents an eccentric rigidly mounted upon the shaft B. The cylinder is composed of two independent concentric tubular members 2 and 3 which are clamped between the base A and the cylinder head 4 by means of stud bolts 5 and nuts 6.

F represents the piston and H a pitman engaging the eccentric C at one end and connected by a pin N to the piston at the opposite end.

The exit valve 7 which may be a sphere of metal, preferably tempered steel, is mounted in a cage or container formed in the cylinder head, and comprising a valve seat member 8, which is closely fitted into a seat in the cylinder head and held in place therein by a cap 9. The member 8 has a narrow annular valve seat 10 upon which the valve normally rests, and which is so located with reference to the valve as to form a stable support for the valve of comparatively large diameter, and with the face of the valve seat approximating an angle of forty five degrees with reference to the vertical axis of the valve, as a steeper angle would be liable to cause the valve to wedge into and stick to the valve seat. Below the valve seat the member 8 is preferably left open at 11 for the free passage of gas to the valve, and above the valve seat the member 8 is recessed at 12 for the free upward passage of the gas around the valve. The cap 9 is detachably secured by bolts 14 to the upper face of the cylinder head, thereby also locking the member 8 firmly in place. The cap 9 is provided with a hemispherical recess 15 to receive the upper portion of the valve, and from which recess a series of small ports 16 lead to the exit gas conduit 17.

The inlet valve 18 is externally spherical and may be either of solid metal or hollow. For valves of the larger sizes the intake valves are preferably made hollow but with walls sufficiently thick to render them substantially rigid. This may be attained by welding together the edges of two hemispherical cups, and then tempering the hollow sphere and grinding it true. The hollow in inlet valves of larger sizes preserves approximately the requisite weight in the valves to properly lift and seat them, while in the exit valves which are smaller and acted upon by gas under pressure the weight of a solid sphere is not objectionable.

The intake valve is provided with a valve seat member 19 seated in a recess in the cylindrical portion of the piston, said member 19 being provided with a narrow annular valve seat 20. The space D across the center of valve below the valve seat is to be as large as practical and preserve the face of the valve seat at a mean angle that will not permit the valve to wedge into and stick to the valve seat. This area of the valve face exposed below the valve seat determines the sensitiveness of the valve or the ease or readiness with which it will lift from its seat to take gas above the piston. The upper portion of the intake valve cage is formed by the piston head 21 which is bolted in place upon the cylindrical portion E of the piston and locks the member 19 in place. A narrow space 22 is provided surrounding the intake valve above its seat to enable the valve to lift and the gas to pass upward around the valve.

From the space 22 the gas escapes through a plurality of short ports 24 through the head 21 into the cylinder above the piston. In order to avoid waste space or clearance and consequent loss of efficiency in the compressor the spaces 22, and 24 are confined to the dimensions necessary to carry the requisite volume of gas. A projection 25 on the piston head 21 enters and occupies the space below the exit valve at the end of the piston stroke.

As illustrated in Fig. 1 the space in member 19 below the valve seat is entirely cut away forming one large intake port. In the modification Fig. 4 the portion of the valve seat member 19' below the valve seat is not entirely cut away but is provided with a series of perforations 27 and a curved recess or chamber 28 beneath the valve through which the gas enters and acts upon the lower face of the intake valve. The valve seat member of the exit valve may also be constructed as illustrated in Fig. 4 if desired. While there is practically no liability of such spherical valves becoming fractured, yet should such occur the valve cage as herein illustrated, particularly in Fig. 4 would prevent any part of the valve escaping from its cage to a place where it might do injury to other parts of the compressor. In Fig. 4 I have also illustrated in cross section the hollow spherical intake valve in which 29 represents the shell or wall of the valve and 30 the hollow space therein. The passages through the valves are particularly free from friction producing angles or projections.

I am thus enabled to produce gas compressor valve mechanism in which the valves are sensitive due to the large surface exposed below the valve seats, in which the valve seat is comparatively narrow and able to readily clear its face of any dirt or foreign matter, in which there is ample space for the gas to pass freely around the valve, in which the valve continually and automatically presents new wearing faces, in which there are no stems, springs or readily breakable parts, and in which broken parts can not escape from the valve cages.

The mechanism herein illustrated is capable of considerable modification without departing from the principle of my invention.

Having described my invention, what I claim is:

1. A gas compressor valve mechanism comprising a spherical valve, a cage member beneath said valve provided with a central gas inlet port and an annular raised valve seat encircling said inlet port, and a cage member above said valve provided with a plurality of gas exit ports, said cage members being locked together, and provided with a partly spherical recess above said valve seat concentrically enveloping said valve and affording a passage for the gas around said valve.

2. A gas compressor valve mechanism comprising a spherical valve, a cage member beneath said valve provided with a central gas inlet port and an annular raised valve seat encircling said inlet port and of a diameter equal to substantially ninety degrees of the circumference of said valve, and a cage member above said valve provided with one or more gas exit ports, said cage members being locked together and provided with a recess above said valve seat enveloping said valve to limit the movement of the valve and provide a passage for the gas around said valve.

3. A gas compressor valve mechanism comprising a spherical valve a divided valve cage inclosing said valve and forming a partly spherical chamber enveloping the valve, an annular inwardly projecting valve seat to support the valve concentrically within said chamber, and gas intake and exit ports leading to and from said chamber.

4. A gas compressor valve mechanism comprising a hollow spherical valve a divided valve cage forming a substantially concentric chamber inclosing said valve, an annular inwardly projecting valve seat supporting said valve in a substantially concentric position within said chamber, and gas intake and exit ports leading to and from said chamber.

5. In a gas compressor valve mechanism an intake valve and an exit valve each comprising a spherical valve, a cage forming a substantially concentric chamber inclosing said valve, an annular raised valve seat to support said valve within and out of contact with the walls of said chamber, and gas intake and exit ports leading to and from said chambers.

6. In a gas compressor valve mechanism an exit valve located in the cylinder head and an intake valve located in the piston each comprising a spherical valve, a cage forming a substantially concentric chamber inclosing said valve, an annular raised valve seat to support said valve within said chamber free from the walls thereof, and gas intake and exit ports leading to and from said chambers.

In testimony whereof I have affixed my signature in presence of two witnesses.

CASPER W. MILES.

Witnesses:
W. THORNTON BOGERT,
B. R. KROPF.